(12) United States Patent
Channakeshava

(10) Patent No.: US 8,533,783 B1
(45) Date of Patent: Sep. 10, 2013

(54) METHOD AND SYSTEM FOR ENABLING AUTOMATIC ACCESS TO AN ONLINE ACCOUNT

(75) Inventor: Girish Mallenahally Channakeshava, Bangalore (IN)

(73) Assignee: Intuit Inc., Mountain View, CA (US)

( * ) Notice: Subject to any disclaimer, the term of this patent is extended or adjusted under 35 U.S.C. 154(b) by 853 days.

(21) Appl. No.: 12/370,491

(22) Filed: Feb. 12, 2009

(51) Int. Cl.
*H04L 29/06* (2006.01)

(52) U.S. Cl.
USPC ............... 726/4; 726/28; 713/168; 713/183

(58) Field of Classification Search
None
See application file for complete search history.

(56) References Cited

U.S. PATENT DOCUMENTS

| 7,296,290 | B2 * | 11/2007 | Barriga et al. | 726/8 |
| 2006/0179304 | A1 * | 8/2006 | Han | 713/168 |
| 2006/0236384 | A1 * | 10/2006 | Lindholm et al. | 726/10 |
| 2007/0250920 | A1 * | 10/2007 | Lindsay | 726/7 |
| 2009/0113530 | A1 * | 4/2009 | Brainard et al. | 726/6 |
| 2009/0254745 | A1 * | 10/2009 | Ganesan | 713/151 |
| 2011/0047372 | A1 * | 2/2011 | Ganesan | 713/155 |

OTHER PUBLICATIONS

Juels et al., "Fourth-Factor Authentication: Somebody You Know", ACM, 2006, p. 1-11.*

* cited by examiner

*Primary Examiner* — Jeffery Williams
(74) *Attorney, Agent, or Firm* — Park, Vaughan, Fleming & Dowler, LLP; Chia-Hsin Suen

(57) ABSTRACT

Some embodiments provide a system that enables access to an online account. During operation, the system receives a login attempt containing a login for the online account through a login interface associated with the online account. Next, the system receives, from the user, user-initiated communications outside of the login interface requesting automatic access to the online account. The system then identifies the online account using the user-initiated communications. Finally, the system temporarily enables the automatic access to the online account using the login from the login attempt without requiring additional authentication information from the login attempt.

9 Claims, 3 Drawing Sheets

METHOD AND SYSTEM FOR ENABLING AUTOMATIC ACCESS TO AN ONLINE ACCOUNT

BACKGROUND

Related Art

The present embodiments relate to techniques for enabling access to online accounts.

Online accounts are typically accessed through a computing device with network connectivity, such as a laptop computer. Furthermore, access to an online account is typically only granted after valid authentication credentials, such as a login and password, are provided by a user of the computing device. Such authentication credentials may be used both to identify the online account and prevent unauthorized access to the online account. Consequently, knowledge of the authentication credentials should be restricted to authorized users of the online account.

However, in practice, authorized users may occasionally permit access to the online account by other users. For example, an authorized user of the online account may wish to access the online account but may not have network connectivity and/or a suitable computing device. As a result, the authorized user may permit a trusted user, such as a friend or family member, to access the online account on the authorized user's behalf using the authorized user's authentication credentials. While such access may be approved by the authorized user, sharing of authentication credentials may violate the security policy of the online account and/or create potential security risks for the online account. For example, the trusted user may accidentally reveal the authentication credentials to a malicious user allowing the malicious user to more easily gain access to the online account and/or other online accounts containing the same password. Furthermore, to maintain security for the online account, the authorized user may be required to change his/her password after sharing the password with the trusted user. Such password changes may be burdensome for the authorized user and may increase the likelihood that the authorized user forgets the new password and is thus unable to access the online account.

Hence, what is needed is a mechanism for enabling access to online accounts by trusted users without revealing authentication credentials for the online accounts to the trusted users.

SUMMARY

Some embodiments provide a system that enables access to an online account. During operation, the system receives a login attempt containing a login for the online account through a login interface associated with the online account. Next, the system receives, from the user, user-initiated communications outside of the login interface requesting automatic access to the online account. The system then identifies the online account using the user-initiated communications. Finally, the system temporarily enables the automatic access to the online account using the login from the login attempt without requiring additional authentication information from the login attempt.

In some embodiments, the system also disables the automatic access to the online account upon establishing a user session for accessing the online account through the login attempt.

In some embodiments, the system also disables the automatic access to the online account if the login attempt is not received within an enabled period corresponding to the temporarily enabled automatic access.

In some embodiments, the system also terminates a user session for accessing the online account through the login attempt upon an expiration of the enabled period if the login attempt is received within the enabled period.

In some embodiments, the user-initiated communications are received after the login attempt and is used to verify a request for the automatic access to the online account from the login attempt.

In some embodiments, the user-initiated communications are received before the login attempt and is used to temporarily enable the automatic access to the online account prior to receiving the login attempt.

In some embodiments, a source of the user-initiated communications is used to identify the online account.

In some embodiments, the user-initiated communications are provided using at least one of a text message, a phone call, and an interactive voice response (IVR) command.

BRIEF DESCRIPTION OF THE FIGURES

In the figures, like reference numerals refer to the same figure elements.

DETAILED DESCRIPTION

Figure 1:
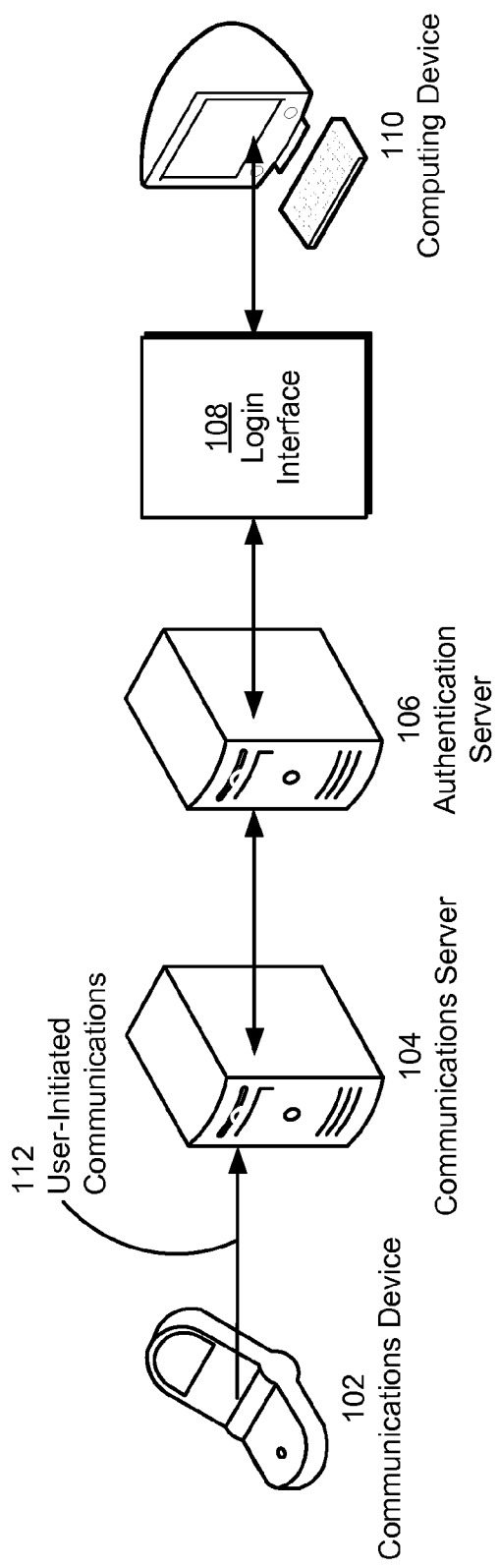
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for enabling access to an online account. The online account may be accessed through a web-based user interface from a computing device with network connectivity, such as a personal computer or laptop computer. In addition, access to the online account may only be granted if valid authentication credentials for the online account, such as a login and password, are received from the computing device.

More specifically, embodiments may provide a method and system for bypassing traditional authentication mechanisms associated with the online account. In particular, automatic access to the online account using only the login may temporarily be enabled by receiving user-initiated communications requesting the automatic access to the online account. The user-initiated communications may be used to identify the online account and enable the automatic access to the online account. A login attempt containing only the login for the online account may be permitted to access the online account while the automatic access is enabled. The automatic access may then be disabled after the login attempt is made and/or upon expiration of an enabled period corresponding to the temporarily enabled automatic access.

FIG. 1 shows a schematic of a system in accordance with an embodiment. The system may be used to enable automatic access to an online account, as described above. As shown in FIG. 1, the system includes a communications device 102, a communications server 104, an authentication server 106, a login interface 108, and a computing device 110.

Authentication server 106 may correspond to a software and/or hardware component that is used to authenticate a user of the online account. To authenticate the user, authentication server 106 may obtain authentication credentials, such as a login, a password, an answer to a security question, and/or a software token, from the user. If the authentication credentials match the authentication credentials for the online account, the user is granted access to the online account. If the authentication credentials do not match the authentication credentials for the online account, the user is denied access to the online account.

To obtain the authentication credentials, authentication server 106 may provide a login interface 108 through which the user may enter the authentication credentials. In one or more embodiments, login interface 108 corresponds to a web-based user interface. For example, login interface 108 may include one or more webpages that obtain the authentication credentials from the user and notify the user of the validity of the authentication credentials. Moreover, because login interface 108 and the online account may be web-based, user access to both login interface 108 and the online account may be restricted to computing devices (e.g., computing device 110) with network connections and web browsers, such as personal computers.

However, the user may not always have access to a computing device that enables interaction with login interface 108. For example, the user may lose network connectivity on his personal computer, or the user may not be near a computing device with a web browser. Consequently, lack of access to a suitable computing device and/or network connection may preclude the user from accessing the online account and performing tasks using the online account. Instead, the user may permit a trusted user, such as a friend or family member, to access the online account and perform tasks using the online account on the user's behalf.

In one or more embodiments, the system of FIG. 1 allows the trusted user to temporarily bypass normal authentication mechanisms enforced by authentication server 106 in accessing the online account. In other words, the trusted user may be allowed to access the online account for the user without acquiring knowledge of the authentication credentials for the online account. The system of FIG. 1 may thus allow greater flexibility in accessing the online account without compromising the security of the online account or violating a security policy for the online account.

To enable access to the online account by the trusted user, the user may send user-initiated communications 112 requesting automatic access to the online account from communications device 102 (e.g., a mobile phone, telephone, etc). User-initiated communications 112 may be provided using a text message, a phone call, and/or an interactive voice response (IVR) command. For example, user-initiated communications 112 may be sent as a text message from a mobile phone, a telephone call between the user and a call center operator, and/or an IVR command sent from a telephone or mobile phone by the user. Furthermore, user-initiated communications 112 may be transmitted over secured and/or trusted communications mechanisms. For example, user-initiated communications 112 may be sent to a phone number provided by communications server 104 to enable access to online accounts with authentication server 106 by trusted users.

User-initiated communications 112 may then be received by communications server 104 and processed to obtain information associated with the request. For example, communications server 104 may determine a source (e.g., phone number) of user-initiated communications 112 and/or parse the contents of user-initiated communications 112 to obtain additional information such as a login and/or password for the online account.

Authentication server 106 may then identify the online account using the source and/or contents of user-initiated communications 112. In particular, authentication server 106 may obtain the source of user-initiated communications 112 and/or the contents of user-initiated communications 112 from communications server 104. Authentication server 106 may use the source and/or the contents to identify the online account, as well as verify the validity of the request in user-initiated communications 112. For example, authentication server 106 may confirm a valid request for automatic access to the online account by matching the phone number from which user-initiated communications 112 is sent and the phone number listed under the online account. The phone number may be obtained from the user during registration for the online account and stored under a database entry for the online account.

Authentication server 106 may also examine the contents of user-initiated communications 112 for valid authentication credentials associated with the online account, such as the login and password for the online account. For example, authentication server 106 may parse the contents of a text message and/or IVR command to obtain the login, password, security token, and/or other authentication credentials required to enable access to the online account by the trusted user.

Next, authentication server 106 may temporary enable automatic access to the online account through login interface 108. In one or more embodiments, authentication server 106 enables automatic access to the online account by allowing access to the online account using only the login for the online account. In other words, authentication server 106 may not require additional authentication information (e.g., password, security token, etc.) outside of the login to grant access to the online account while automatic access to the online account is enabled.

After automatic access to the online account is enabled, the trusted user may access the online account on a network-connected computing device (e.g., computing device 110) by providing a login attempt containing the login for the online account through login interface 108. If the login attempt is made while automatic access to the online account is enabled, a user session for accessing the online account is established with the trusted user. In other words, the user session may allow the trusted user to perform tasks associated with the online account on the user's behalf.

In one or more embodiments, the login attempt is made before user-initiated communications 112 are received by communications server 104. User-initiated communications 112 may thus be used to verify a request for automatic access to the online account from the previously received login attempt, as described below with respect to FIG. 3. Alternatively, the login attempt may be made after user-initiated communications 112 are received by communications server 104. Consequently, user-initiated communications 112 may be used to temporarily enable automatic access to the online account prior to receiving the login attempt, as discussed below with respect to FIG. 2.

In one or more embodiments, the temporary enabling of automatic access to the online account corresponds to an enabled period during which automatic access to the online account is enabled. For example, automatic access to the online account may be enabled for an enabled period of five minutes after user-initiated communications 112 is received. The enabled period may also limit the duration of the user session created from the automatic access.

The enabled period may be set by authentication server 106 (e.g., for security reasons) and/or specified by the user in user-initiated communications 112 (e.g., to allocate time for performing tasks on the online account by the trusted user). If the login attempt is not received within the enabled period, the automatic access is disabled and authentication server 106 may resume the use of normal authentication mechanisms in granting access to the online account. Alternatively, the user may manually disable automatic access to the online account prior to the expiration of the enabled period by sending additional user-initiated communications from communications device 102 to communications server 104. For example, the user may transmit a text message containing a request to disable automatic access to the online account prior to the expiration of a five-minute enabled period for automatic access to the online account. Authentication server 106 may disable automatic access to the online account upon receiving the request instead of waiting until the enabled period has expired.

The automatic access may also be disabled upon establishing the user session for accessing the online account through the login attempt. In other words, automatic access to the online account may be disabled after the first successful attempt to access the online account using automatic access. Finally, the user session may be terminated upon expiration of the enabled period if the trusted user has not logged out of the online account by then.

Figure 2:
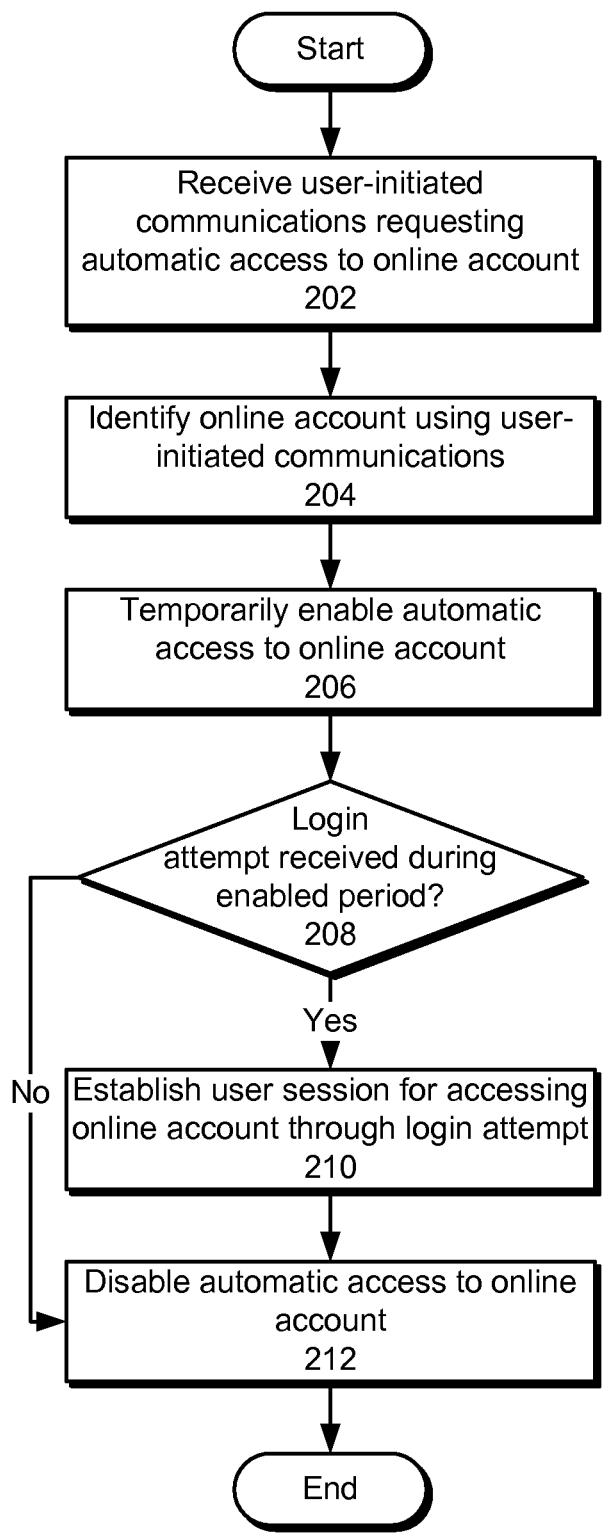
FIG. 2 shows a flowchart illustrating the process of enabling access to an online account in accordance with an embodiment.

FIG. 2 shows a flowchart illustrating the process of enabling access to an online account in accordance with an embodiment. In one or more embodiments, one or more of the steps may be omitted, repeated, and/or performed in a different order. Accordingly, the specific arrangement of steps shown in FIG. 2 should not be construed as limiting the scope of the technique.

Initially, user-initiated communications requesting automatic access to the online account are received (operation 202). The user-initiated communications may be sent by a user of the online account as a text message, phone call, and/or IVR command. As a result, the user-initiated communications may originate from a phone number linked to the online account. The user-initiated communications may also include other information associated with the request, such as authentication credentials for the online account and/or an enabled period during which the automatic access is allowed. The phone number and/or contents of the user-initiated communications may then be used to identify the online account (operation 204).

Next, automatic access to the online account is temporarily enabled (operation 206). The automatic access may correspond to granting access to the online account using only the login for the online account and without requiring additional authentication information from the login attempt. In addition, the automatic access may only be enabled during the enabled period. The automatic access may also be terminated prior to the expiration of the enabled period if additional user-initiated communications (e.g., text message, phone call, IVR command, etc.) requesting such termination are received from the user. If a login attempt containing the login for the account is received during the enabled period (operation 208), a user session for accessing the online account through the login attempt is established (operation 210) and the online account may be accessed using the user session.

As described above, the user session may be terminated upon expiration of the enabled period. Furthermore, automatic access to the online account is disabled after the user session is established (operation 212). If a login attempt containing the login for the account is not received during the enabled period, automatic access to the online account is disabled (operation 212) and normal authentication mechanisms for granting access to the online account are resumed.

Figure 3:
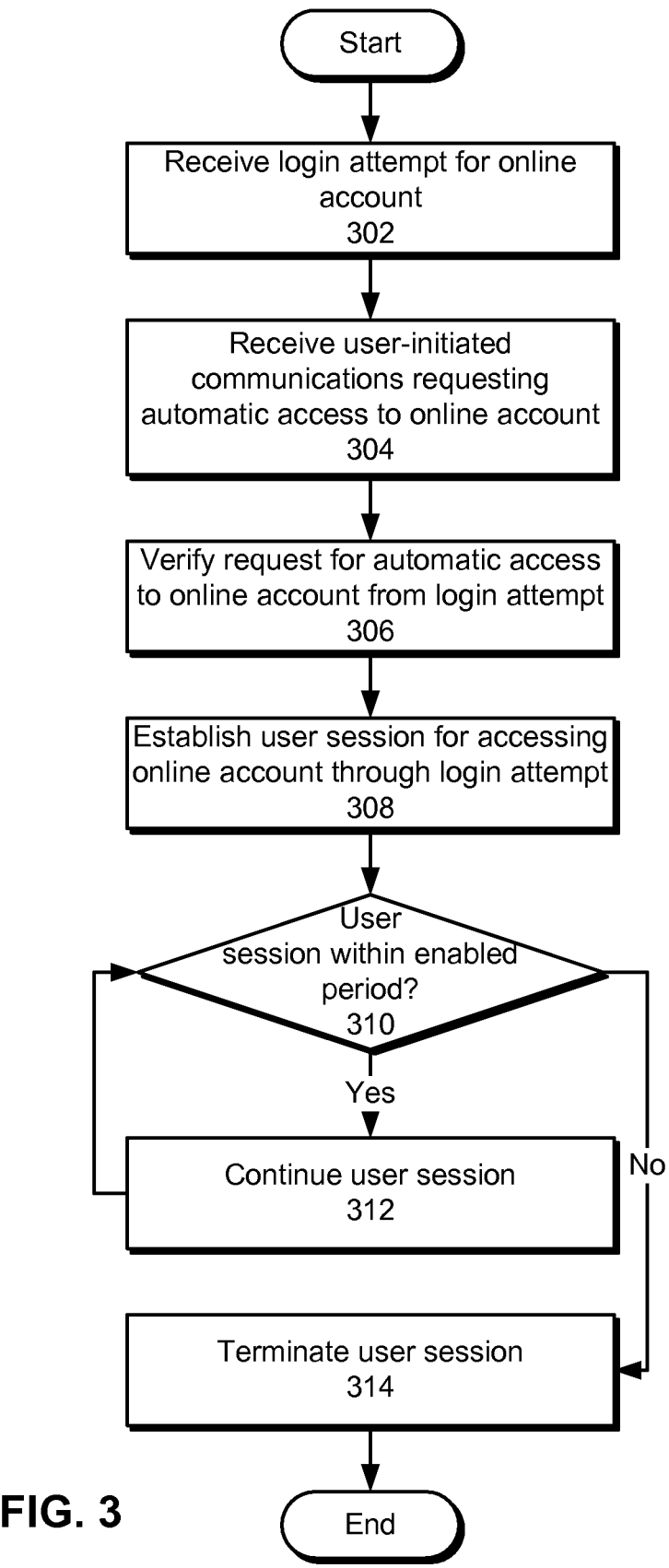
FIG. 3 shows a flowchart illustrating the process of verifying automatic access to an online account in accordance with an embodiment.

FIG. 3 shows a flowchart illustrating the process of verifying automatic access to an online account in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

First, a login attempt for the online account is received (operation 302). The login attempt may contain incomplete authentication credentials for the online account, such as only a login for the online account. In other words, the login attempt may include a request for automatic access to the online account using only the login. Such a request may be implicit in providing only the login to the online account, or the request may be made by entering the login through a special area (e.g., webpage) of a login interface for the online account, such as an "automatic access" webpage of the login interface. Because the authentication credentials are incomplete, automatic access to the online account through the login attempt may require confirmation from a user of the online account.

In particular, the confirmation may be received from the user as user-initiated communications also requesting automatic access to the online account (operation 304). The user-initiated communications may be used to verify the request for automatic access to the online account from the login attempt (operation 306). As mentioned previously, verification of the request for automatic access from the login attempt and/or identification of the online account from the user-initiated communications may involve examining the source and/or contents of the user-initiated communications.

Next, a user session for accessing the online account through the login attempt is established (operation 308). The user session may allow a trusted user providing the login attempt to access the online account on the user's behalf. In addition, the user session may only be valid during an enabled period (operation 310) that limits the duration of automatic access to the online account. If the user session remains within the enabled period, the user session is allowed to continue (operation 312). However, once the user session is no longer within the enabled period, the user session is terminated (operation 314) and normal authentication mechanisms for granting access to the online account are resumed.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for enabling access to an online account associated with a first user, comprising:
   a computer receiving from a first device having a phone number that is associated with the online account of the first user, user initiated communications to enable online access to the account by a second user who is different from the first user, wherein the user initiated communications comprises a text message or a phone call to the computer, and includes a predetermined period of time, a login identifier of the first user, and an authentication credential of the first user;
   the computer determining, based upon the phone number, the login identifier, and the authentication credential, that the user initiated communications to enable online access to the account was received from the first user;
   the computer receiving, from a second device used by the second user, a request to access the online account associated with the first user, wherein the request to access the online account associated with the first user includes the login identifier of the first user, and does not include the authentication credential of the first user;
   the computer determining that the request to access the online account associated with the first user is received during the predetermined period of time; and
   the computer granting to the second user access to the online account associated with the first user.

2. The computer-implemented method of claim 1, further comprising:
   upon receiving a subsequent login attempt from the first user, to the second user, disabling access to the online account associated with the first user.

3. The computer-implemented method of claim 1, further comprising:
   using a source of the user-initiated communications to identify the online account.

4. A non-transitory computer-readable storage medium storing instructions that when executed by a computer cause the computer to perform a method for enabling access to an online account, the method comprising:
   receiving from a first device having a phone number that is associated with the online account of the first user, user initiated communications to enable online access to the account by a second user who is different from the first user, wherein the user initiated communications comprises a text message or a phone call to the computer, and includes a predetermined period of time, a login identifier of the first user, and an authentication credential of the first user;
   determining, based upon the phone number, the login identifier, and the authentication credential, that the user initiated communications to enable online access to the account was received from the first user;
   receiving, from a second device used by the second user, a request to access the online account associated with the first user, wherein the request to access the online account associated with the first user includes the login identifier of the first user, and does not include the authentication credential of the first user;
   determining that the request to access the online account associated with the first user is received during the predetermined period of time; and
   granting to the second user access to the online account associated with the first user.

5. The non-transitory computer-readable storage medium of claim 4, wherein the method further comprises:
   upon receiving a subsequent login attempt from the first user, to the second user, disabling access to the online account associated with the first user.

6. The non-transitory computer-readable storage medium of claim 4, wherein the method further comprises:
   using a source of the user-initiated communications to identify the online account.

7. A system for enabling access to an online account, comprising:
   a computer processor; and
   a non-transitory computer-readable storage medium storing instructions that when executed by the computer processor cause the computer processor to perform a method for enabling access to an online account, the method comprising:
   receiving from a first device having a phone number that is associated with the online account of the first user, user initiated communications to enable online access to the account by a second user who is different from the first user, wherein the user initiated communications comprises a text message or a phone call to the computer, and includes a predetermined period of time, a login identifier of the first user, and an authentication credential of the first user;
   determining, based upon the phone number, the login identifier, and the authentication credential, that the user initiated communications to enable online access to the account was received from the first user;
   receiving, from a second device used by the second user, a request to access the online account associated with the first user, wherein the request to access the online account associated with the first user includes the login identifier of the first user, and does not include the authentication credential of the first user;
   determining that the request to access the online account associated with the first user is received during the predetermined period of time; and
   granting to the second user access to the online account associated with the first user.

8. The system of claim 7, wherein the method performed by the computer processor further comprises:
   upon receiving a subsequent login attempt from the first user, to the second user, disabling access to the online account associated with the first user.

9. The system of claim 7, wherein the method performed by the computer processor further comprises:

using a source of the user-initiated communications to identify the online account.

\* \* \* \* \*